United States Patent
Wang et al.

(10) Patent No.: US 7,289,728 B2
(45) Date of Patent: Oct. 30, 2007

(54) USE OF VARIABLE RATIO COUPLERS FOR NETWORK PROTECTION AND RECOVERY

(75) Inventors: Shamino Y. Wang, San Jose, CA (US); Chandra S. Jasti, Cupertino, CA (US)

(73) Assignee: General Instrument Corporation, Horsham, PA (US)

( * ) Notice: Subject to any disclaimer, the term of this patent is extended or adjusted under 35 U.S.C. 154(b) by 497 days.

(21) Appl. No.: 10/798,706

(22) Filed: Mar. 11, 2004

(65) Prior Publication Data
US 2005/0201749 A1    Sep. 15, 2005

(51) Int. Cl.
*H04B 10/00*  (2006.01)
*H04B 10/08*  (2006.01)
*H04J 14/00*  (2006.01)

(52) U.S. Cl. .................. 398/5; 398/1; 398/19; 398/25; 398/33; 398/17; 385/16; 385/24; 385/34; 385/45

(58) Field of Classification Search .............. 398/9–59, 398/1, 5; 385/15–20
See application file for complete search history.

(56) References Cited

U.S. PATENT DOCUMENTS

| | | | |
|---|---|---|---|
| 5,510,917 A * | 4/1996 | Corke et al. ............ | 398/34 |
| 6,215,565 B1 * | 4/2001 | Davis et al. ............ | 398/27 |
| 6,925,219 B2 * | 8/2005 | Pfeiffer .................. | 385/16 |
| 2005/0019031 A1 * | 1/2005 | Ye et al. .................. | 398/19 |
| 2005/0249499 A1 * | 11/2005 | Krimmel et al. ........ | 398/59 |

FOREIGN PATENT DOCUMENTS

EP     1143646     * 10/2001

\* cited by examiner

*Primary Examiner*—Kenneth Vanderpuye
*Assistant Examiner*—Li Liu
(74) *Attorney, Agent, or Firm*—Larry T Cullen

(57) ABSTRACT

The disclosure is directed toward an optical transmission system comprising a primary path disposed between a first end and a second end. The primary path is configured to transmit optical signals between the first end and the second end. A secondary path is disposed between the first end and the second end. The secondary path is configured to transmit optical signals between the first end and the second end, e.g., in the event of a break in the primary path. A first variable ratio coupler is coupled to the primary path and the secondary path between the first end and the second end. The first variable ratio coupler is configured to adjust a coupling ratio between the primary path and the secondary path.

18 Claims, 3 Drawing Sheets

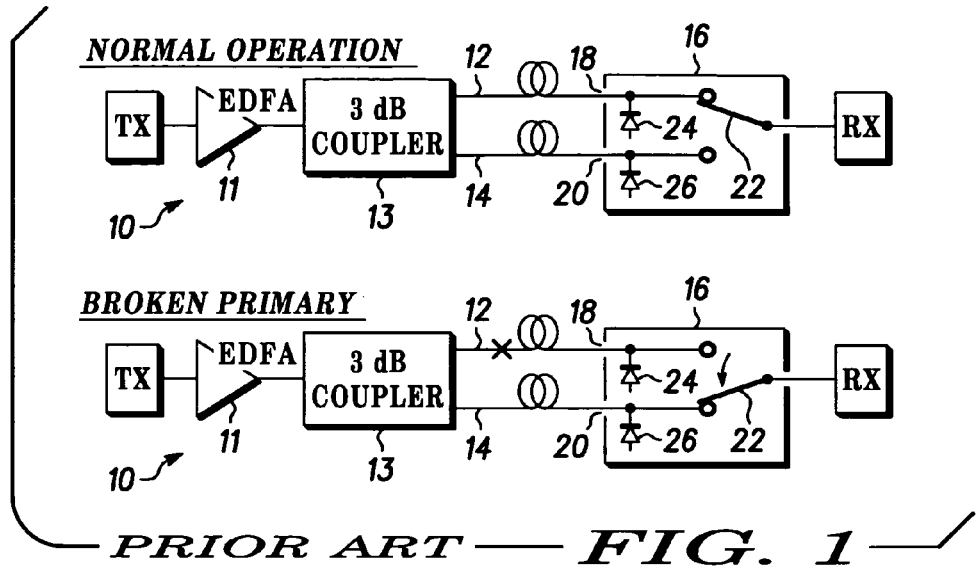
PRIOR ART — FIG. 1
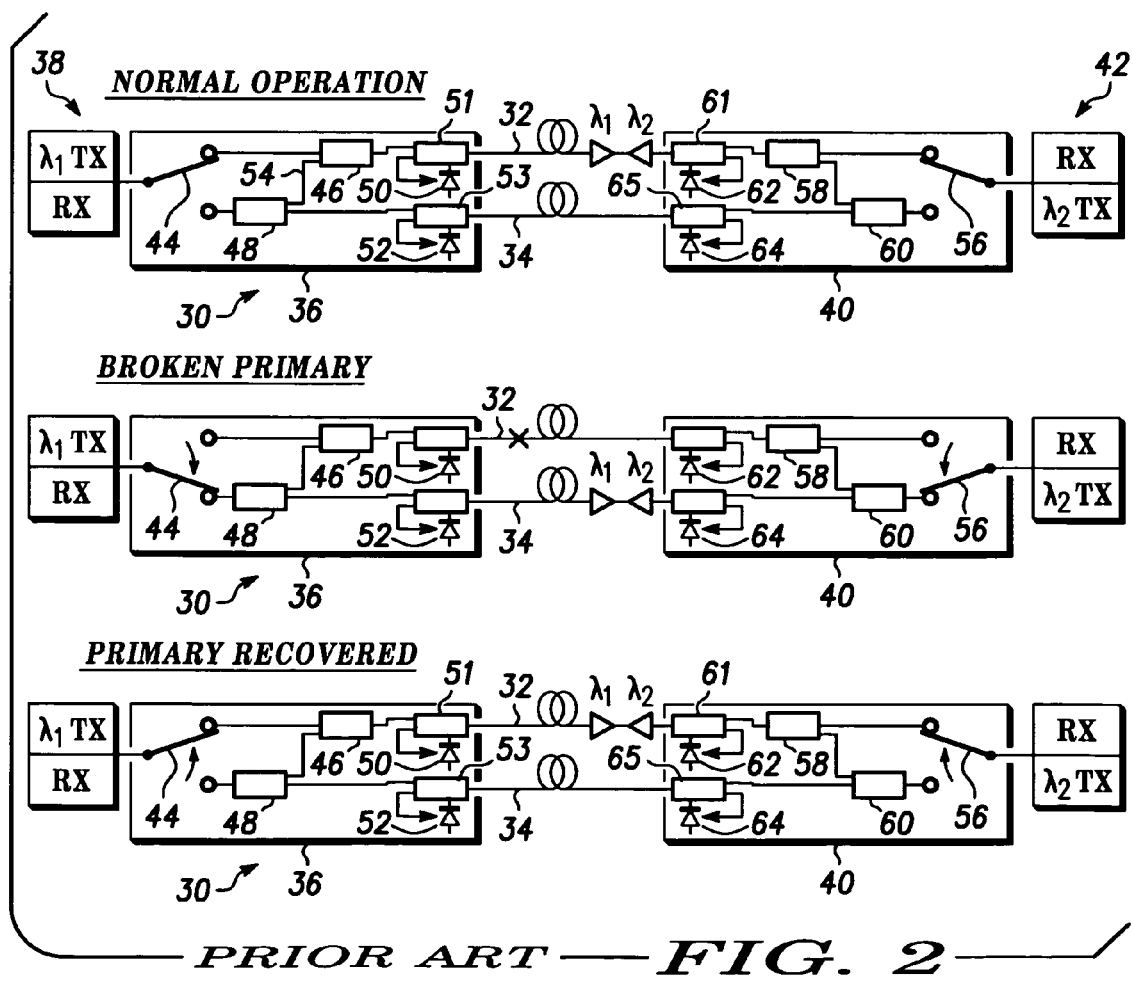
PRIOR ART — FIG. 2

USE OF VARIABLE RATIO COUPLERS FOR NETWORK PROTECTION AND RECOVERY

BACKGROUND OF THE INVENTION

The present invention relates to protection of point-to-point unidirectional and bi-directional fiber-optic transmission lines, and particularly to replacement of commonly used optical switches with variable ratio couplers for the protection of the fiber-optic transmission lines and up to about 3 dB insertion loss improvements.

Currently, transmission systems employed in the cable television (CATV) industry provide two-way transmission of information (e.g., video, audio, multimedia and/or data) between a head end and a plurality of subscribers. The head end transmits the information destined for individual subscribers in optical format (i.e., downstream information) through one or more fiber optic links to one or more optical nodes. Each node converts the optically-formatted downstream information into electrical signals for distribution, typically via a coaxial cable plant having a tree and branch architecture, to individual subscribers. In addition to receiving the downstream information, each individual subscriber may generate information in the form of voice, video, data, or any combination thereof, destined for the head end. The subscriber-generated information (i.e., upstream information) is aggregated by the coaxial cable plant and passes to the node for conversion into an optical format for transmission to the head end.

CATV service providers and their subscribers are accustomed to high reliability service. One way in which high reliability service is achieved is by providing two optical paths between the head end and each optical node; a first serving as a primary optical path and a second serving as a secondary (or backup) optical path. An optical switch routes the optical information signals from the primary path to the secondary path in the event of an unanticipated failure in the primary path. The optical switches are often located in the head end and the optical nodes.

The optical switches generally employ an opto-mechanical switching component that switches between the primary path and the secondary path based on the electrical voltage that is applied. A portion of the optical signal in the primary and secondary paths is monitored and converted to an electrical voltage. The voltages are monitored and if a threshold condition is violated, indicating a failure in the primary path, the switch is activated so that traffic is transferred to the secondary path. However, the optical switch does not include any arrangement for switching back from the secondary path to the primary path after the primary path has been restored. Rather, an operator or technician must perform a manual power cycle to restart the optical switches in both the head end and the optical node so that the switches return to the primary path. Restoration in this manner can be difficult because the head end and the optical node may be located 50 to 100 kilometers apart. Also, there may be many such optical switches in both the head and the nodes, thus requiring the operator to take proper care to ensure that the correct combination of switches are power cycled so that there is no interference with traffic on the other paths.

The prior art solution to the above difficulty with responsive switching is to use automatic switches that provide protection based on detection of a change in power level in one of the two optical paths.

FIG. 1 illustrates a block diagram of a unidirectional point-to-point prior art transmission system. An optical transmission system 10 is illustrated having a primary path 12 and a secondary path 14 adapted to receive signals transmitted via an optical path that may include, e.g., an Erbium doped fiber amplifier (EDFA) 11. A conventional 3 dB optical coupler 13 couples the transmitted signal to the paths 12, 14. An optical protection switch module 16 having a 1×2 configuration is operatively coupled to both the primary path 12 and the secondary path 14. The optical protection switch module 16 includes a primary port 18 coupled to the primary path 12 and a secondary port 20 coupled to the secondary path 14. The optical protection switch module 16 includes a switch element 22 coupled to both the primary port 18 and the secondary port 20 and configured to switch between one of the two ports 18 and 20 in order to maintain the optical transmission system 10 operable. A primary detector 24 is coupled to the primary port 18 and configured to perform basic power level detection of the primary path 12. A secondary detector 26 is coupled to the secondary port 20 and configured to perform basic power level detection of the secondary path 14. In the event of a break in the primary path 12, the primary detector 24 detects low power in the primary path 12. The switch element 22 of the optical protection switch module 16 actuates and switches from the primary path 12 to the secondary path 14. The optical protection switch module 16 functions to maintain the optical transmission system 10 by switching to the better path based on power level detection.

Although the optical protection switch module 16 is a useful means of protection for the optical transmission system 10, there are losses (e.g., 2 decibels (dB)) associated with the use of the optical protection switch module 16.

A prior art solution for the protection of a bi-directional point-to-point transmission system is illustrated in FIG. 2. A block diagram of a bi-directional point-to-point optical transmission system 30 is illustrated. The optical transmission system 30 includes a primary path 32 and a secondary path 34. The transmission system 30 has a first optical switch 36 coupled at a head end 38 of the transmission system 30 to both the primary path 32 and the secondary path 34. A second optical switch 40 is coupled to both the primary path 32 and the secondary path 34 at an optical node end 42. The first optical switch 36 includes a switch element 44, a primary directional coupler 46, a secondary directional coupler 48, a primary optical detector 50, and a secondary optical detector 52. A coupler 51 is provided to couple the input signal $\lambda_1$ to primary path 32 when switch 44 is in the upper position. Coupler 51 also couples a portion of the return signal $\lambda_2$ from path 32 to the primary optical detector 50. A coupler 53 couples the input signal $\lambda_1$ to secondary path 34 when switch 44 is in the lower position. Coupler 53 also couples a portion of the return signal $\lambda_2$ from path 34 to the secondary optical detector 52. The second optical switch 40 has a similar configuration, including a switch element 56, four couplers 58, 60, 61, 65 and two detectors 62, 64.

The first optical switch 36 utilizes the directional coupler 46 to couple the input signal $\lambda_1$ to the primary path 32 or the directional coupler 48 to couple the input signal $\lambda_1$ to the secondary path 34, depending on the position of switch 44. In the event that the secondary path 34 is in use to carry the input signal $\lambda_1$ (switch 44 in lower position), a small portion of the input signal $\lambda_1$ is coupled via path 54 and couplers 46, 51 to the primary path 32. In this way, optical detector 62 at the second optical switch 40 can be used to verify when the primary path 32 has been repaired after a break. If the signal $\lambda_1$ is detected by the detector 62, then the primary path is successfully communicating the signal, and switch 44 can be switched back to the upper position to couple the full power of input signal $\lambda_1$ to the primary path.

Similarly, directional coupler 60 of second optical switch 40 couples a small portion of the return signal $\lambda_2$ to the primary path 32 (via directional coupler 58) for detection by optical detector 50 when the secondary path 34 is being used (switch 56 in lower position). If detector 50 detects the return signal $\lambda_2$ in the primary path 32 when the switch 56 is in the lower position, this will indicate that the primary path is functioning, and switch 56 can be switched back to the upper position to couple the full power of the return signal $\lambda_2$ to the primary path.

A break in the primary path 32 will be detected by the detectors 50, 62. In response to such a break, the switch elements 44, 56 are actuated and switch to the secondary path 34. The transmission of the optical signals is thereby maintained in the bi-directional optical transmission system 30. In response to the repair and restoration of the primary path 32, the switch elements 44, 56 are actuated to switch back to the primary path 32. The primary state of transmission is automatically restored without the need to power cycle at the head end 38 or at the optical node end 42.

The bi-directional point-to-point optical transmission system 30 is effective in preventing transmission failure in the event of a single break in the primary path 32. However, by employing two switches and four tap couplers, the system incurs significant link insertion losses (e.g., up to about 6 dB).

What is needed in the art is an optical transmission system that eliminates the losses of the prior art structure while maintaining system reliability.

SUMMARY OF THE INVENTION

The present disclosure is directed toward an optical transmission system comprising a primary path disposed between a first end and a second end. The primary path is configured to transmit optical signals between the first end and the second end. A secondary path is disposed between the first end and the second end. The secondary path is configured to transmit optical signals between the first end and the second end. A first variable ratio coupler is coupled to the primary path and the secondary path between the first end and the second end. The first variable ratio coupler is configured to adjust a coupling ratio between the primary path and the secondary path.

BRIEF DESCRIPTION OF THE DRAWINGS

Referring now to the figures, wherein like elements are numbered alike:

FIG. 1 illustrates a prior art unidirectional point-to-point optical transmission system.

FIG. 2 illustrates a prior art bi-directional point-to-point optical transmission system.

DETAILED DESCRIPTION OF THE INVENTION

Persons of ordinary skill in the art will realize that the following description of the present disclosure is illustrative only and not in any way limiting. Other embodiments of the invention will readily suggest themselves to such skilled persons having the benefit of this disclosure.

An exemplary optical transmission system having variable ratio couplers for point-to-point unidirectional and bi-directional fiber optic transmission is disclosed. The optical transmission system replaces commonly used 1×2 optical switches with variable ratio couplers.

Figure 3:
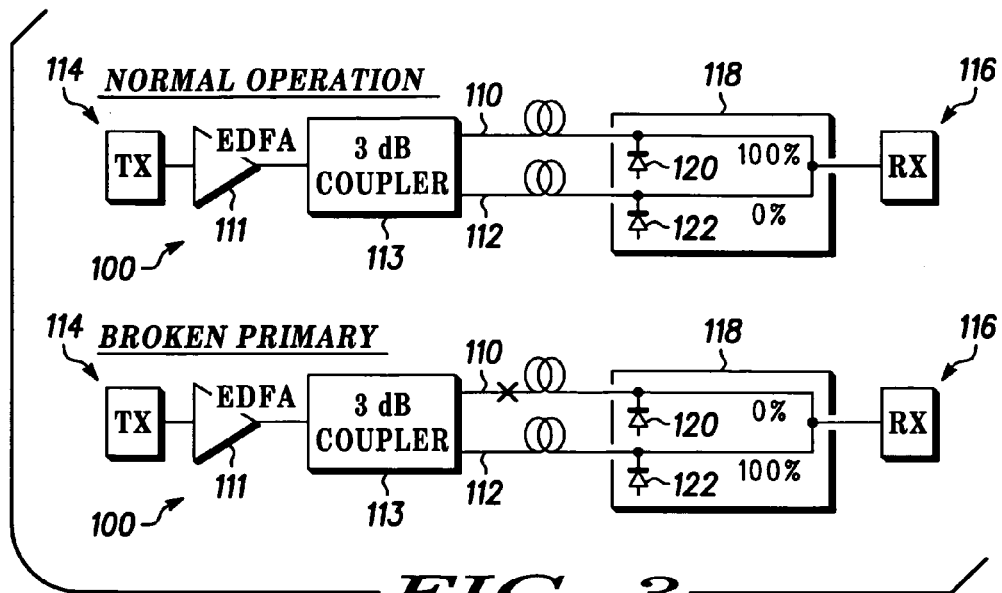
FIG. 3 illustrates an exemplary unidirectional optical transmission system.

FIG. 3 illustrates an exemplary embodiment of an optical transmission system 100. The optical transmission system 100 includes a primary path 110 and a secondary path 112 disposed between a head end transmitter 114 and an optical node end 116. One or more optical amplifiers, such as an Erbium doped fiber amplifier (EDFA) 111 can be provided in the optical transmission system. A coupler, such as 3 dB coupler 113, is provided to split the transmission path into the primary and secondary paths 110, 112. The primary path 110 transmits optical signals in normal operation. The secondary path 112 is a backup path for the off-normal conditions and transmits the optical signals when the primary path 110 is not functional. A variable ratio coupler 118 is coupled to both the primary path 110 and the secondary path 112 between the head end 114 and the optical node end 116. The variable ratio coupler 118 includes a primary detector 120 coupled to the primary path 110. The primary detector 120 is configured to detect the presence of optical signals transmitted along the primary path 110. The variable ratio coupler 118 includes a secondary detector 122 coupled to the secondary path 112. The secondary detector 122 is configured to detect optical signals along the secondary path 112.

The variable ratio coupler 118 replaces prior art switches. In an exemplary embodiment, the variable ratio coupler 118 can be a polished directional coupler with a variable coupling ratio. The variable ratio coupler 118 can be used to divide or combine optical signals from the primary path 110 and the secondary path 112. The variable ratio coupler 118 can be adjusted to any coupling ratio from about 0% to about 100%. For example, a micrometer adjuster (not shown) can be employed to adjust the coupling ratio. Any other known variable ratio coupler technology may alternatively be used to provide the desired coupling ratio adjustment. The variable ratio coupler 118 has a high degree of sensitivity and has low loss characteristics. In a preferred embodiment, the variable ratio coupler 118 can eliminate 2 dB of loss caused by the prior art switches. The variable ratio coupler 118 maintains the reliability of the optical transmission system 100, while eliminating the losses.

In the event that the primary path 110 is broken, the variable ratio coupler 118 can adjust the coupling ratio in order to shift over to the secondary path 112 for transmission. For example, if the primary path 110 is transmitting 100% of the optical signals and the secondary path 112 is transmitting 0% of the optical signals, the variable ratio coupler 118 can be adjusted to shift the optical signal. Upon detection of a signal failure by the primary detector 120, the primary path 110 is determined to be non-functional. The variable ratio coupler 118 can be adjusted such that about 100% of the optical signal is transmitted along the secondary path 112 and about 0% of the optical signal is transmitted along the primary path 110. The optical transmission system 100 can also be configured with a complete system failure alarm, or simply a both paths down alarm (not shown). In the event that both the primary detector 120 and the secondary detector 122 detect loss of signals due to the primary path 110 and the secondary path 112 being broken, the alarm can indicate the complete loss of system transmission.

Figure 4:
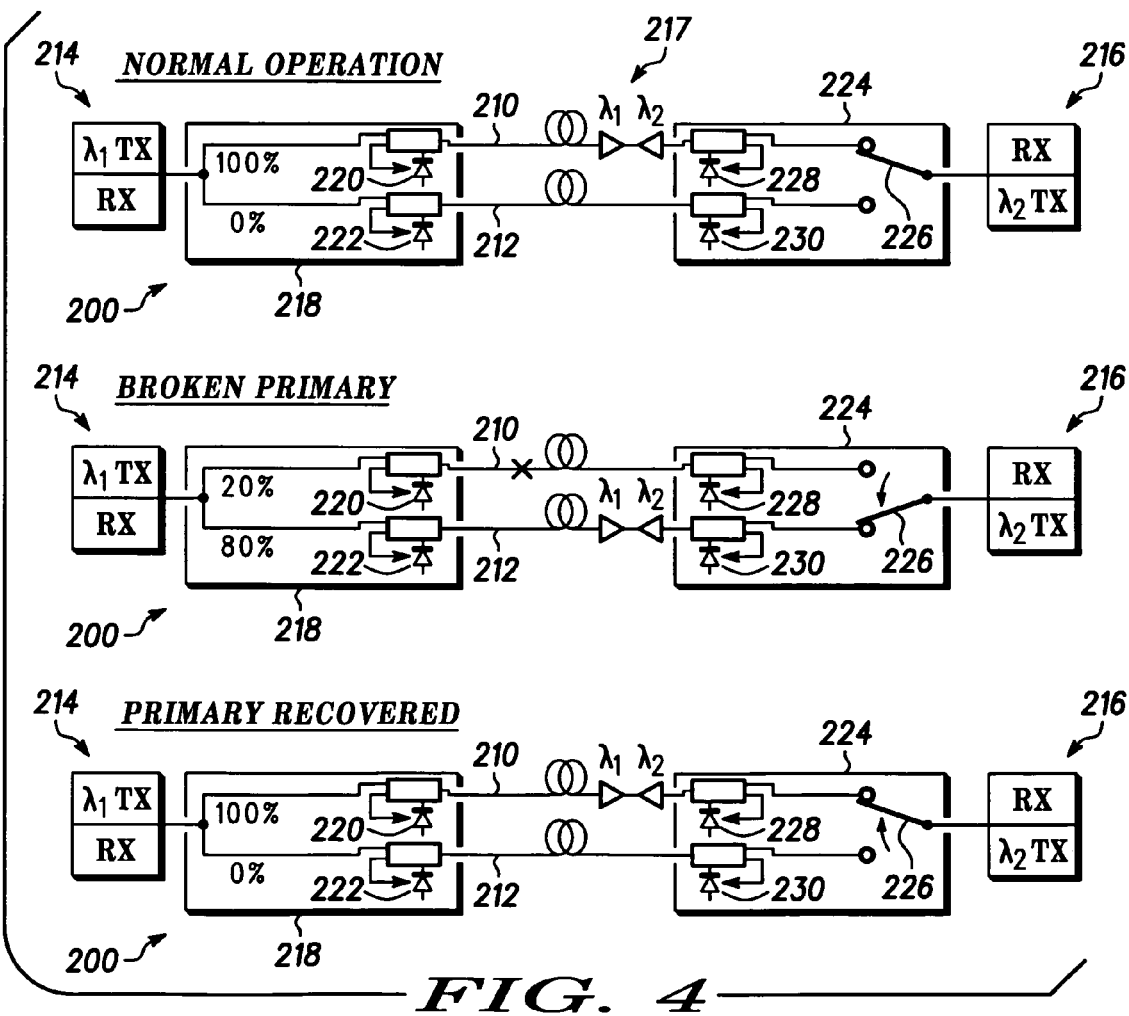
FIG. 4 illustrates an exemplary bi-directional optical transmission system.

FIG. 4 illustrates an exemplary embodiment of a bi-directional optical transmission system 200. The optical transmission system 200 includes a primary path 210 and a secondary path 212 disposed between a head end 214 and an optical node end 216 of a link 217. The primary path 210 transmits optical signals between both ends 214, 216 of the link 217 in normal operation. The secondary path 212 is a backup path for the off-normal conditions, and transmits the optical signals between the link 217 when the primary path 210 is not functional.

A variable ratio coupler 218 is coupled to both the primary path 210 and the secondary path 212 between the head end 214 and the optical node end 216. The variable ratio coupler 218 includes a primary detector 220 coupled to the primary path 210. The primary detector 220 is configured to detect the presence of optical signals transmitting along the primary path 210. The variable ratio coupler 218 includes a secondary detector 222 coupled to the secondary path 212. The secondary detector 222 is configured to detect optical signals along the secondary path 212.

An optical switch 224 is coupled to both the primary path 210 and the secondary path 212 opposite the variable ratio coupler 218 between the head end 214 and the optical node end 216. The optical switch 224 includes a switch element 226 coupled between the primary path 210 and the secondary path 212. The optical switch 224 includes a primary switch detector 228 coupled to the primary path 210 and a secondary switch detector 230 coupled to the secondary path 212. The optical switch 224 is configured to switch between the primary path 210 and the secondary path 212, such that optical signals can transmit along the optical transmission system 200 reliably.

The variable ratio coupler 218 replaces a prior art switch in the prior art bi-directional optical transmission system. The variable ratio coupler 218 can be used to divide, or combine, optical signals from the primary path 210 and the secondary path 212. The variable ratio coupler 218 can be adjusted to any coupling ratio from about 0% to about 100%. In the event the primary path 210 has a break, the optical switch 224 can actuate and switch from the primary path 210 to the secondary path 212. The variable ratio coupler 218 can be adjusted to transmit about 80% of the optical signal through the secondary path 212 and about 20% of the optical signal through the primary path 210. By maintaining a 20% ratio on the primary path 210, it will be possible for detectors 220 and 228 to detect the resumption of a signal on the primary path, e.g., once the break has been repaired. When the primary path 210 has been restored, the optical switch 224 can switch back to the primary path 210. The variable ratio coupler 218 can then be re-adjusted to transmit, e.g., 100% of the optical signal through the primary path 210 and 0% of the optical signal through the secondary path 212. The variable ratio coupler 218 is not link dependent. The variable ratio coupler 218 can set the ratio between the primary path 210 and the secondary path 212 as required for the particular implementation of the optical transmission system 200.

By eliminating one of the two switches from the prior art system, the exemplary embodiment provides the capacity to transmit 100% in the primary path 210 due to the reduction of the losses resulting from the removal of prior art switch. The exemplary embodiment permits link independency, such that the splitting ratio can be adjusted for the proper loss budget of the link 217. In particular, the splitting ratio can be adjusted for the loss budget of the link 217 based on the length of the link 217. The capability of the exemplary optical transmission system 200 having the variable ratio coupler 218 is equivalent to having a built-in variable optical attenuator (VOA) function.

Figure 5:
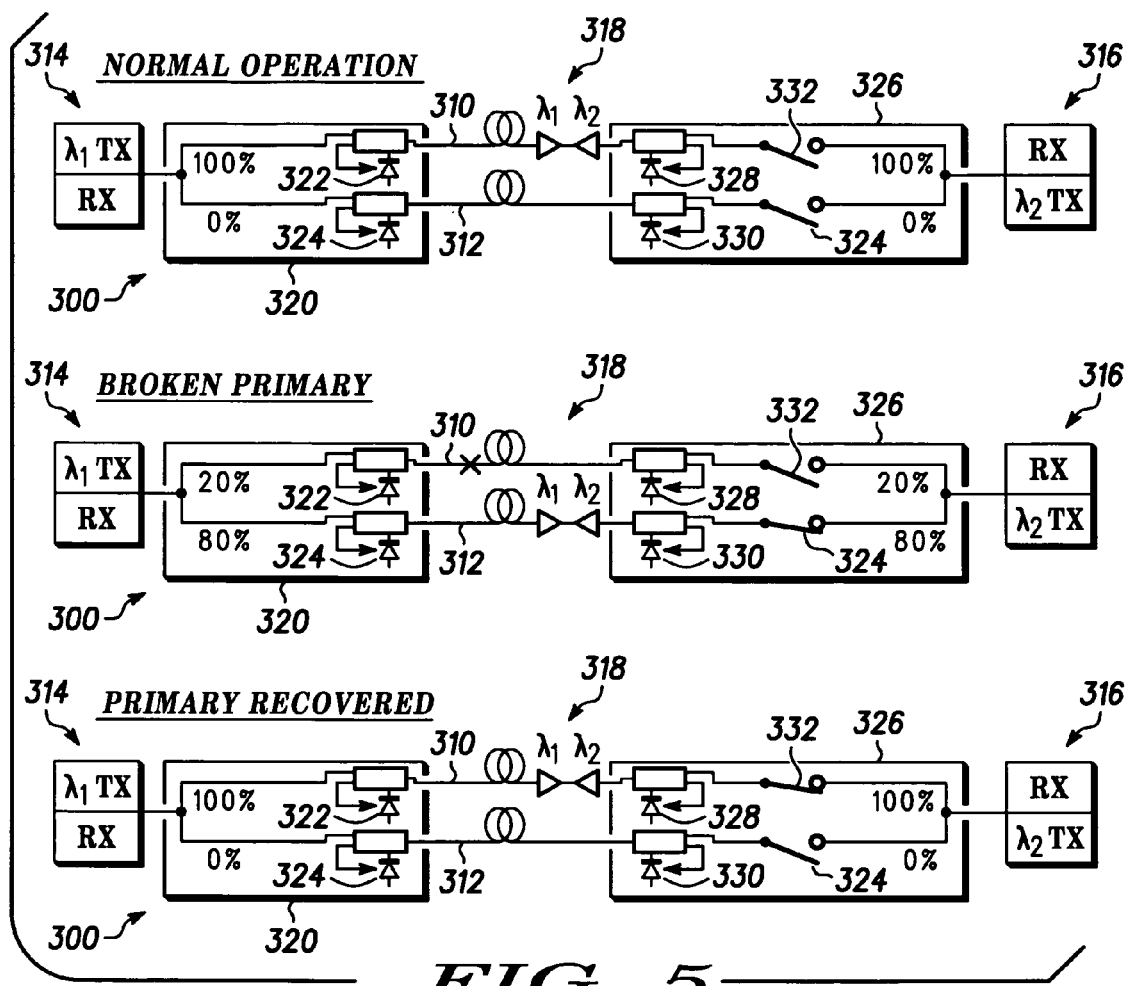
FIG. 5 illustrates another exemplary bi-directional optical transmission system.

FIG. 5 illustrates an exemplary embodiment of a bi-directional optical transmission system 300. The optical transmission system 300 includes a primary path 310 and a secondary path 312 disposed between a first end 314 and a second end 316 of a link 318. The primary path 310 transmits optical signals between both ends 314, 316 of the link 318 in normal operation. The secondary path 312 is a backup path for off-normal conditions, and transmits the optical signals between the ends 314, 316 of the link 318 when the primary path 310 is not functional.

A first variable ratio coupler 320 is coupled to both the primary path 310 and the secondary path 312 near the first end 314. The first variable ratio coupler 320 includes a first primary detector 322 coupled to the primary path 310. The first primary detector 322 is configured to detect the presence of optical signals transmitted along the primary path 310. The first variable ratio coupler 320 includes a first secondary detector 324 coupled to the secondary path 312. The first secondary detector 324 is configured to detect optical signals along the secondary path 312.

A second variable ratio coupler 326 is coupled to both the primary path 310 and the secondary path 312 near the second end 316. The second variable ratio coupler 326 includes a second primary detector 328 coupled to the primary path 310. The second primary detector 328 is configured to detect the presence of optical signals transmitted along the primary path 310. The second variable ratio coupler 326 includes a second secondary detector 330 coupled to the secondary path 312. The second secondary detector 330 is configured to detect optical signals along the secondary path 312. The second variable ratio coupler 326 includes a primary switch element 332 coupled to the primary path 310. The second variable ratio coupler 326 includes a secondary switch element 334 coupled to the secondary path 312. The primary switch element 332 and the secondary switch element 334 are configured to couple and decouple the primary path 310 and the secondary path 312 within the link 318 of the optical transmission system 300.

The exemplary embodiment of the optical transmission system 300 includes variable ratio couplers 320 and 326 on both ends 314 and 316 of the link 318. In the event of a break in the primary path 310, the first primary detector 322 of the first variable ratio coupler 320 detects the break (e.g., low signal power). The first variable ratio coupler 320 adjusts from having 100% of the optical signal at the primary path 310 to a value less than 100%, preferably at a value of about 20%. The first variable coupler 320 adjusts to about an 80% value to the secondary path 312. The second variable ratio coupler 326 having detected the break in the primary path due to low power detected at the second primary detector 328, adjusts from a 100% value to about a 20% value at the primary path 310. The second variable ratio coupler 326 also actuates the primary switch element 332 open and closes the secondary switch element 334. In the off-normal condition, about 20% of the signal is allocated to the primary path 310 and about 80% of the signal is passing through the secondary path 312. The ratio of the values between the primary path 310 and the secondary path 312 can be varied depending on the configuration of the link 318 and the optical transmission system 300.

When the primary path 310 recovers, the first variable ratio coupler 320 can be readjusted such that 100% passes through the primary path 310. The second variable ratio coupler 326 can be readjusted such that 100% passes through the primary path 310. The primary switch element 332 and the secondary switch element 334 can be reconfigured to allow for the signals to pass through the primary path 310. In a preferred embodiment, the detectors 322, 324, 328 and 330 can be employed to adjust the splitting ratio of the corresponding first variable ratio coupler 320 and second variable ratio coupler 326. The detectors 322, 324, 328, and 330 can be employed to trigger the primary switch element 332 and the secondary switch element 334 to be in an open state or a closed state. The primary switch element 332 and the secondary switch element 334 are configured, such that only one of the two switches 332 and 334 are open. In this configuration, the primary path 310 and the secondary path 312 cannot be simultaneously operating. There can be no multi-path interference as a result of the configuration. The primary switch element 332 and the secondary switch element 334 have only about 0.3 dB maximum insertion loss. The link budget of link 318 is therefore not significantly degraded.

The inventive concepts disclosed herein enjoy many advantages. Among these are up to about a six dB link insertion loss improvement by replacing two switches and four couplers as compared to prior art implementations. Moreover, a higher optical power handling capability (e.g., up to two watts or more) is provided for as compared to only about a 300 milliwatt capability for prior art structures using switches. Elimination of splicing between switches and couplers is also achieved where a variable ratio coupler is used as disclosed herein. By using a variable ratio coupler instead of a prior art switch, switch stiction (i.e., a stuck optical switch) and chattering effects are also removed. Further, link independency is provided with the inventive structure, since the splitting ratio can be adjusted for the proper loss budget of the link (e.g., based on the length of the link). Still further, substantially 100% transmission can be achieved in the primary path.

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. An optical transmission system comprising:
    a primary path disposed between a first end and a second end, said primary path configured to transmit optical signals between said first end and said second end;
    a secondary path disposed between said first end and said second end, said secondary path configured to transmit optical signals between said first end and said second end;
    a first variable ratio coupler coupled to said primary path and said secondary path between said first end and said second end, said first variable ratio coupler configured to adjust a coupling ratio between said primary path and said secondary path; and
    a second variable ratio coupler coupled to said primary path and said secondary path between said first end and said second end opposite said first variable ratio coupler, wherein said second variable ratio coupler comprises:
        a second primary detector coupled to said primary path and a second secondary detector coupled to said secondary path, and
        a primary switch element coupled to said primary path and a secondary switch element coupled to said secondary path.

2. The optical transmission system of claim 1 wherein said first variable ratio coupler comprises a primary detector coupled to said primary path and a secondary detector coupled to said secondary path.

3. The optical transmission system of claim 2 wherein said primary detector is configured to detect optical signals transmitted along said primary path and said secondary detector is configured to detect optical signals transmitted along said secondary path.

4. The optical transmission system of claim 1 wherein said primary path is configured to transmit optical signals in a normal condition and said secondary path is configured to transmit optical signals in an off-normal condition.

5. The optical transmission system of claim 1 wherein said first variable ratio coupler is configured to detect optical signals on said primary path and said secondary path and adjust said coupling ratio between said primary path and said secondary path responsive to a break in said primary path.

6. The optical transmission system of claim 5 wherein said coupling ratio between said primary path and said secondary path is adjusted to about 100% for said secondary path and about 0% for said primary path in response to said break.

7. The optical transmission system of claim 1 wherein said first variable ratio coupler is configured to detect optical signals on said primary path and said secondary path and adjust said coupling ratio between said primary path and said secondary path responsive to a repair of said primary path.

8. The optical transmission system of claim 1 wherein said first variable ratio coupler is configured to adjust said coupling ratio from about 0% to about 100%.

9. The optical transmission system of claim 1 further comprising:
    a paths down alarm configured to indicate a complete loss of system transmission responsive to both the primary detector and the secondary detector detecting a loss of signal.

10. The optical transmission system of claim 1 further comprising:
    an optical switch coupled to said primary path and said secondary path opposite said first variable ratio coupler between said first end and said second end, said optical switch configured to switch between said primary path and said secondary path responsive to the presence of optical signals.

11. The optical transmission system of claim 10 wherein said optical switch comprises:
    a switch element in operative communication with both said primary path and said secondary path,
    a primary switch detector coupled to said primary path, and
    a secondary switch detector coupled to said secondary path.

12. The optical transmission system of claim 1 wherein a link is defined between said first end and said second end, said first variable ratio coupler being configured to adjust said coupling ratio in response to a loss budget of said link.

13. The optical transmission system of claim 1 wherein said second variable ratio coupler is configured to adjust said coupling ratio between said primary path and said secondary path.

14. The optical transmission system of claim 1 wherein said primary switch element and said secondary switch element are configured to couple and decouple said primary path and said secondary path.

15. The optical transmission system of claim 1 wherein said first variable ratio coupler and said second variable ratio coupler are configured to adjust said coupling ratio between said primary path and said secondary path.

16. The optical transmission system of claim 1 wherein said first variable ratio coupler and said second variable ratio coupler are configured to adjust said coupling ratio between said primary path and said secondary path responsive to one of a primary path break and a primary path recovery.

17. The optical transmission system of claim 1 wherein said primary switch element and said secondary switch element are configured to prevent simultaneous operation of said primary path and said secondary path.

18. The optical transmission system of claim 1 wherein said first variable ratio coupler and said second variable ratio coupler are adjustable and configured to readjust passing 100% through said primary path responsive to a recovery of said primary path.

* * * * *